(No Model.)
G. H. WILLETTS.
SEED PLANTER.
No. 512,079. Patented Jan. 2, 1894.
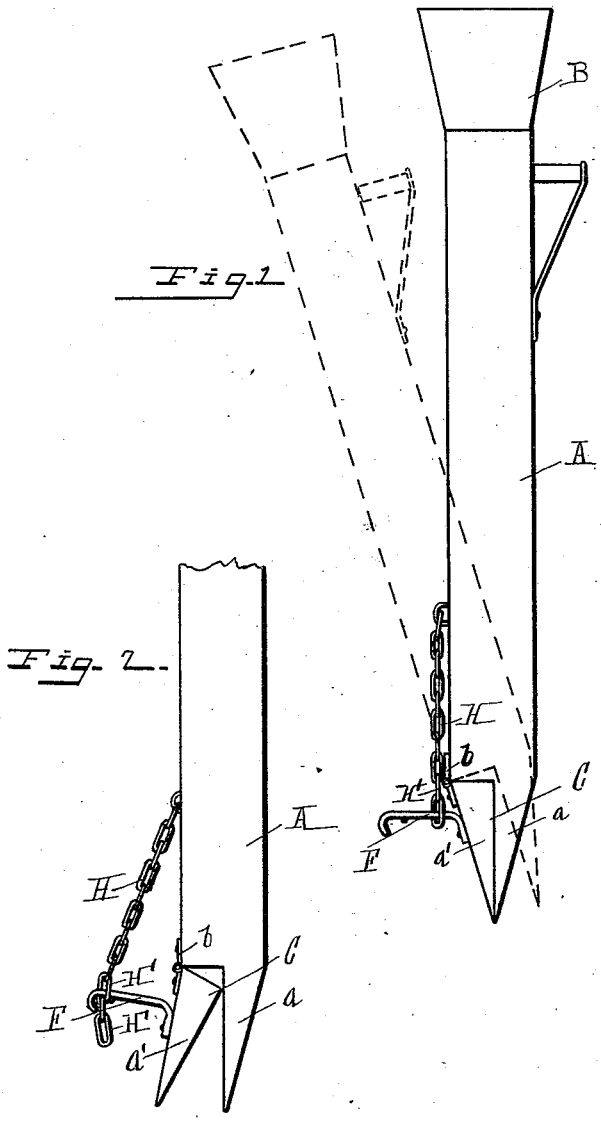
WITNESSES
Geo. M. Anderson
Phill C. Masi
INVENTOR
Geo. H. Willetts
by E. W. Anderson
his Attorney

UNITED STATES PATENT OFFICE.

GEORGE HENRY WILLETTS, OF MIDDLE LANCASTER, PENNSYLVANIA.

SEED-PLANTER.

SPECIFICATION forming part of Letters Patent No. 512,079, dated January 2, 1894.

Application filed June 2, 1893. Serial No. 476,360. (No model.)

*To all whom it may concern:*

Be it known that I, GEORGE HENRY WILLETTS, a citizen of the United States, and a resident of Middle Lancaster, in the county of Butler and State of Pennsylvania, have invented certain new and useful Improvements in Seed-Planters; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a side elevation showing tube inclined in dotted lines, and Fig. 2 is an elevation partly broken away showing movable jaw partially raised.

This invention relates to certain new and useful improvements in seed planters, the object being to provide a simple and practical device of improved character for planting potatoes, corn, beans, &c.; and it consists in the novel construction and combination of parts, all as hereinafter described and pointed out in the claim.

Referring to the accompanying drawings, the letter A designates the planter, which is of that class known as hand planters, and which consists in a hollow tube, terminating at its upper end in a flaring, open, mouth portion B, and at its lower end in a flattened V-shaped point C. One part $a$ of this point is integral with the tube A, while the opposing section $a'$ is hinged to said tube at $b$. Attached to said hinged section, and projecting laterally therefrom is an arm or lever F, the purpose of which will presently appear. In operating this device the seed is dropped into the flaring mouth B, and the point pushed into the ground by placing the foot upon the arm or lever F. The planter is then pushed over or forwardly, as indicated by the dotted lines, Fig. 1, the arm or lever F taking a bearing upon the ground, and causing the hinged jaw section to open and drop the seed. This is the operation when the ground has not been previously drilled or furrowed. When however, a drill or furrow has been previously opened, the lever F is fastened back against the tube at $f$, by means of a chain H attached to the tube and having links H' which hook on the lever. By means of these links the jaw section $a'$ may be opened to a greater or less extent according to the size and character of the seed.

The use of this planter saves much time and labor over the old method of stooping over and placing the seed in the ground with the hand, which is very laborious and tiresome work. Moreover, by its use, the seeds can be placed more nearly at the exact point than can be done with the hand, (unless care is taken to bend over to within a few inches of the ground,) the seeds being prevented from rolling away, and the rows or drills may be planted more nearly straight. The present device is also more accurate than those planters which are provided with devices for dropping automatically a certain number of seeds at a time, for the reason that none of the planters in use can be relied upon to drop a uniform number of seeds at each operation. With the planter above described, the requisite number of seeds are dropped into the mouth of the tube by hand at each operation, thus insuring uniformity.

Another important use to which the invention may be put is that of applying fertilizer in hill dressing. The commercial fertilizers commonly used are usually in a more or less dry pulverized state, and in applying to the hill with the hand, great care must be taken to prevent the fine and oftentimes most valuable parts from being blown away. This renders it necessary for the person to bend over until his hand is within a few inches of the ground.

With my device as above described, the person may walk in an upright position, dropping the fertilizer into the mouth of the tube, with the assurance that it will be deposited at the proper point.

Having thus described my invention, what

I claim as new, and desire to secure by Letters Patent, is—

A seed planter consisting of a hollow tube, terminating at its upper end in a flaring, open mouthed portion, and at its lower end in a broad, flattened sectional point, one section of which is integral with the said tube, and the other section hinged to said tube, and an arm or lever attached to said hinged section, substantially as specified.

In testimony whereof I affix my signature in presence of two witnesses.

GEORGE HENRY WILLETTS.

Witnesses:
C. J. I. STROHECKER,
R. S. LEVIS.